United States Patent [19]

Hines

[11] 3,718,848
[45] Feb. 27, 1973

[54] SERIES-PARALLEL BATTERY SYSTEM AND SWITCH THEREFORE
[75] Inventor: Charles E. Hines, Lincoln, Nebr.
[73] Assignee: Outboard Marine Corporation, Waukegan, Ill.
[22] Filed: March 29, 1971
[21] Appl. No.: 128,928

[52] U.S. Cl....................320/7, 200/11 B, 318/139
[51] Int. Cl...............................................H02j 7/00
[58] Field of Search...........318/139; 320/6, 7, 15–18; 200/11 R, 11 B, 11 EA, 6, 5

[56] References Cited

UNITED STATES PATENTS

| | | | |
|---|---|---|---|
| 1,474,942 | 11/1923 | Probst | 318/139 X |
| 3,387,194 | 6/1968 | Banks | 318/139 |
| 2,604,556 | 7/1952 | Daly et al. | 318/139 X |
| 3,510,745 | 5/1970 | Futterer | 320/7 |
| 3,005,882 | 10/1961 | White | 200/11 EA |
| 3,177,305 | 4/1965 | Lehman | 200/11 B |
| 3,223,908 | 12/1965 | Hutchinson et al. | 318/139 |

Primary Examiner—J. D. Miller
Assistant Examiner—Robert J. Hickey
Attorney—Robert E. Clemency, John W. Michael, Gerrit D. Foster, Bayard H. Michael, Paul R. Purener, Joseph A. Gemignani and Andrew O. Riteris

[57] ABSTRACT

Disclosed herein is a vehicle including an electrical system comprising a direct current drive motor, first and second battery sets, a charger adapted to be plugged into an alternating current source, and a selector switch movable between first and second positions and operable, when in the first position, to connect the first and second battery sets in parallel relation to the motor operable, when in the second position, to connect the first and second battery sets in series relation to the motor and to the charger. In addition, the electrical system includes an "off-on" switch interposed between the motor and the selector switch and operable to selectively open and close the connection of the motor to the selector switch whereby, when the "off-on" switch is opened, and the selector switch is in the second position, the charger can be plugged into an alternating current source to charge the battery sets and whereby, when the selector switch is in the first position, the charger is electrically disconnected from the battery sets.

9 Claims, 8 Drawing Figures

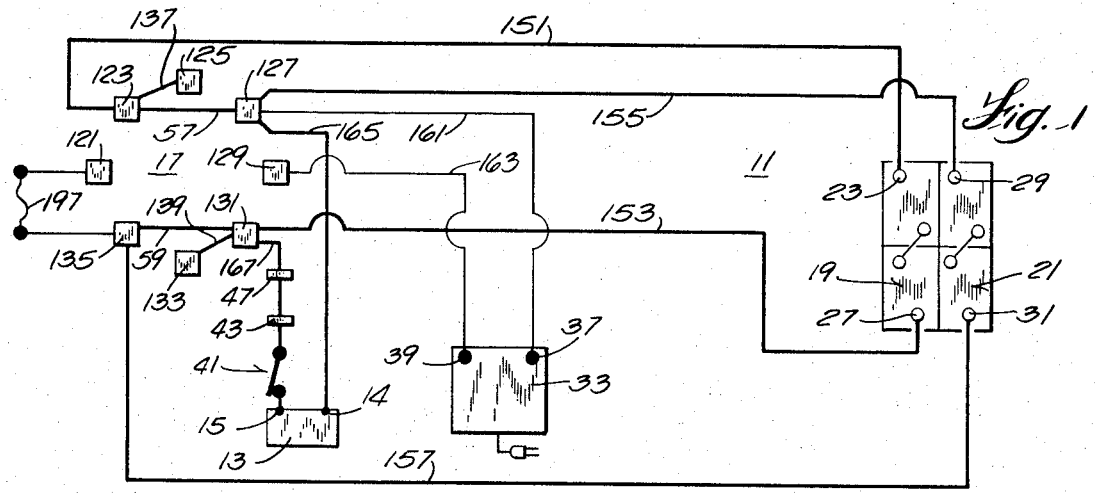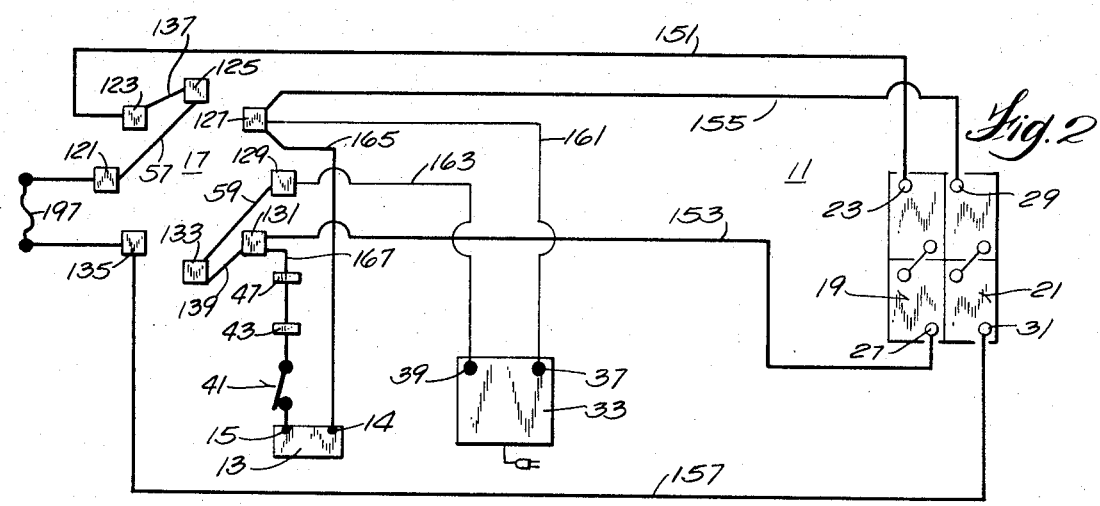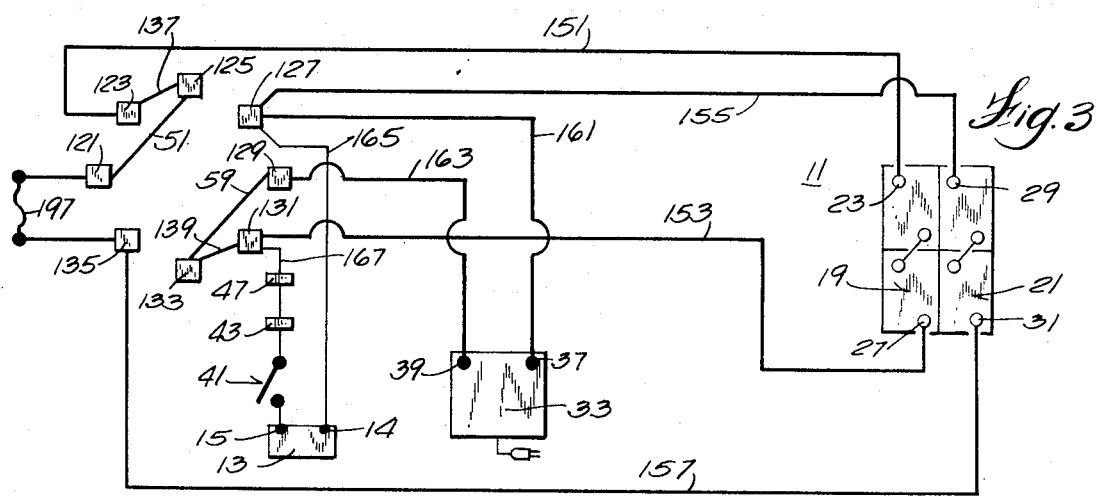

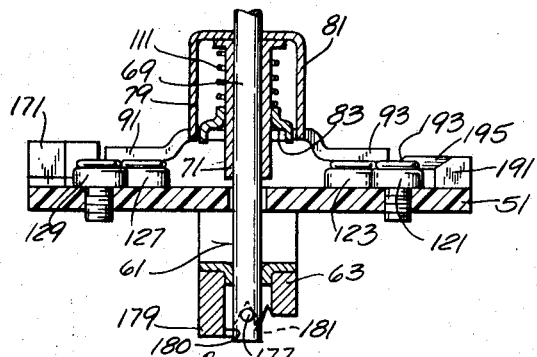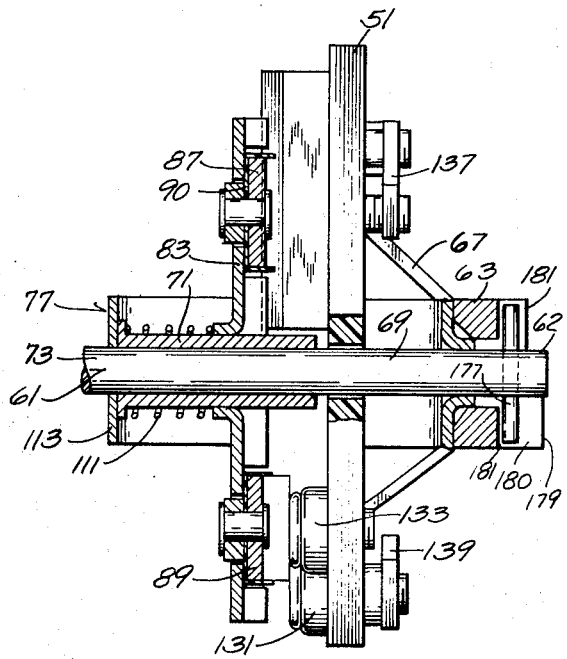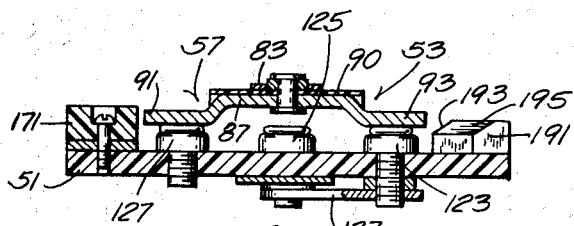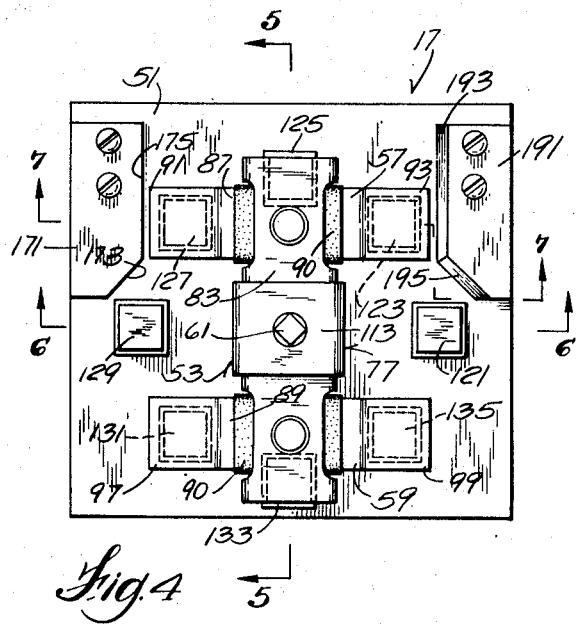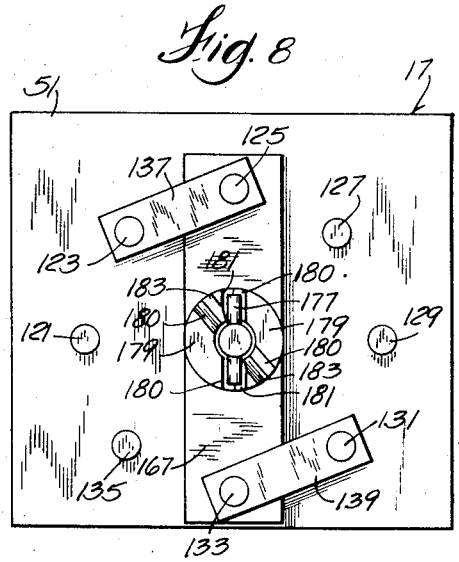

SERIES-PARALLEL BATTERY SYSTEM AND SWITCH THEREFORE

BACKGROUND OF THE INVENTION

The invention relates generally to battery driven vehicles, such as golf carts. More particularly, the invention relates to electrical systems affording driving of such vehicles at high and low speeds and to switching arrangements for affording such variation in speeds and for affording charging of the batteries incorporated in such vehicles. The prior U.S. Barreau Pat. No. 649,797, as well as the Dannettell Pat. No. 3,264,540 and the Parkinson U.S. Pat. No. 3,207,966, all disclose connection of a motor to a plurality of batteries, with the batteries being selectively connected to the motor in either parallel or series arrangements.

In regard to switching arrangements, three position rotary switches have been commonly utilized in electrically driven golf carts as "reversing" switches. Such switches have employed a rotary bus bar assembly including two spaced and parallel bus bars movable between three positions, with the bus bars cooperating with eight electrically independent contacts equiangularly spaced at a common radius from the axis of the bus bar assembly.

SUMMARY OF THE INVENTION

The invention provides an electrical system for a battery powered electrically driven vehicle, such as a golf cart, to afford high and low speed ranges and to afford charging of the batteries. More particularly, the invention provides a selector switch which, in cooperation with a driving motor, two battery sets, and a battery charging device, is movable between two positions which respectively connect the motor to the batteries in a series arrangement which provides high speed motor operation and in a parallel arrangement which provides low speed motor operation. In addition, the selector switch is connected to the battery charger so that when the switch is in the position with the batteries in series connection with the motor to provide high speed operation, the motor can be disconnected from the batteries by an independent "off-on" switch and the charger can be plugged into an alternating current source to effect charging of the batteries. Still further, the selector switch is arranged and is connected to the battery charger so that when the switch is in the position affording parallel arrangement of the batteries to afford low speed operation, the electrical connection of the battery charger to the batteries is prevented.

The invention also provides a two position rotary switch which has particular utility in connection with the electrical system referred to above.

The principal object of the invention is the provision of an electrical system which affords alternate arrangement of a group of batteries in either series or parallel connection to a driving motor while, at the same time, permits charging of the batteries when the batteries are arranged in series connection and prevents electrical connection of the battery charger to the batteries when the batteries are arranged in parallel relation.

Another of the principal objects of the invention is the provision of a two position switch which is capable of affording the selection referred to in the previous paragraph.

Other objects and advantages of the invention will become known by reference to the following description and accompanying drawings.

DRAWINGS

FIG. 1 is a schematic wiring diagram of an electrical system which embodies various of the features of the invention and which illustrates, in heavy outline, the parallel connection of the batteries to the electric motor.

FIG. 2 is a diagram similar to FIG. 1 showing the series connection of the batteries to the electric motor in heavy outline.

FIG. 3 is a view similar to FIG. 1 showing the series connection of the batteries to the charger in heavy outline.

FIG. 4 is a plan view of a selector switch embodying various of the features of the invention.

FIG. 5 is a view, partially in section, taken along line 5—5 of FIG. 4.

FIG. 6 is a view, partially in section, taken along line 6—6 of FIG. 4.

FIG. 7 is a view, partially in section, taken along line 7—7 of FIG. 4.

FIG. 8 is a view of the bottom or back side of the switch shown in FIG. 4.

GENERAL DESCRIPTION

FIGS. 1 through 3 are fragmentarily and schematically illustrative of an electrical circuit or system 11 employed in a battery powered, electrically driven vehicle (not shown), which system 11 affords selective connection of a direct current electric motor 13 having terminals 14 and 15 by a selector switch 17 (see also FIG. 4) to first and second battery sets 19 and 21.

As used herein, the term "battery sets" refers to a single battery or to several batteries connected in series. In the specifically disclosed construction, each battery set 19 and 21 comprises two series connected six volt batteries and includes respective terminals 23-27 and 29-31. In accordance with the invention, the selector switch 17 is operable between two positions to connect the battery sets 19 and 21 to the motor 13 in either series or parallel relation. The circuit or system 11 also includes a battery charger 33 which includes terminals 37 and 39 and which is connected to the selector switch 17 so as to permit charging when the battery sets 19 and 21 are arranged in series relation, and so as to preclude charging when the battery sets 19 and 21 are arranged in parallel relation.

The electrical circuit or system 11 also includes an independent "off-on" switch 41 interposed between the motor 13 and the selector switch 17 and operable to selectively open and close the electrical connection of the motor 13 to the selector switch 17, whereby when the "off-on" switch 41 is open and the selector switch 17 is in the position connecting the battery sets 19 and 21 in series (see FIG. 3), the charger 33 can be plugged into an alternating current source to charge the batteries, and whereby, when the selector switch 17 is in the position arranging the battery sets 19 and 21 in parallel relation (see FIG. 1), electrical connection of the charger 33 to the battery sets 19 and 21 is prevented.

In the particularly disclosed construction, the circuit 11 also includes a reversing switch 43 and an accelerator switch 47 which are conventional and which are connected in series with the "off-on" switch 41 and the motor 13.

The selector switch 17 is shown best in FIGS. 4 through 8 and, in general, comprises a supporting or mounting plate 51 which is fabricated of insulating material and which has mounted thereon a bus bar assembly 53 which is movable between the two positions respectively affording series and parallel relation of the battery sets 19 and 21 and which includes two bus bars 57 and 59. More particularly, the bus bar assembly 53 is rotatably mounted relative to the mounting plate 51 and includes (see FIG. 5) a rotary shaft 61 which extends through the mounting plate 51 and which, at the end 62, is supported by a bushing 63 fixed on a bridging bracket 67 fixed to the mounting plate 51. Intermediate its ends, the shaft 61 includes a portion 69 which extends through a sleeve 71 and terminates at its other end in a portion 73 which includes means (not shown) according attachment of a knob or handle (not shown) to assist in moving the bus bar assembly 53 between its two positions.

Fixed to the rotary shaft 61 inwardly of the outer end portion 73, is a U-shaped member 77 having (see FIG. 6) spaced legs 79 and 81 which extend toward the mounting plate 51 and which encompass a cross support 83 which is centrally apertured to receive the sleeve 71. At each of its ends, the cross support 83 carries one of the bus bars 57 and 59 which extend generally at right angles to the cross support 83 and which respectively include center portions 87 and 89 connected to the cross support 83 and terminal end portions 91–93 and 97–99 located closer to the mounting plate 51 than the center portions 87 and 89. The details of the connection of the bus bars 57 and 59 to the cross support 83 are not a part of the invention so long as it is understood that the bus bars 57 and 59 are insulated from the cross support 83 by insulators 90 (see FIG. 7).

The cross support 83 and connected bus bars 57 and 59 are biased toward the mounting plate 51 by (see FIGS. 5 and 6) a compression spring 111 which surrounds the sleeve 71 and, at its upper end, is seated against the web 113 of the U-shaped member 77 and, at its lower end, seats against the cross support 83.

Arranged on the mounting plate 51 are two groups of contacts, one group for each bus bar 57 and 59. More particularly, the selector switch 17 includes eight contacts 121, 123, 125, 127, 129, 131, 133, and 135 which are located at a common radius from the rotary axis of the bus bar assembly 53 and which are equiangularly spaced from one another. (In FIGS. 1, 2, and 3, the switch contacts are seen from the rear of the switch as also shown in FIG. 8.) As a consequence, each of the bus bars 57 and 59, in each position of the bus bar assembly 53, spans or electrically connects a pair of contacts which are located to either side of a non-engaged contact which can be, at least in part, located generally below the associated raised bus bar central portion 87 or 89. Except for movement limitation to two positions, as thus far disclosed, the selector switch 17 is conventionally constructed.

In accordance with the invention, the contacts 123 and 125 and the contacts 131 and 133 are electrically connected to each other. While various arrangements can be employed, in the disclosed construction, the contacts 123 and 125 and the contacts 131 and 133 are respectively electrically connected (see FIGS. 1, 2, 3, and 8) by a pair of electrical straps or connectors 137 and 139 mounted on the rear of the mounting plate 51. In effect, such connections cause the contacts 123 and 125 to constitute a first contact means and to cause the contacts 131 and 133 to constitute a second contact means. In addition, the contacts 121 and 135 are connected (see FIGS. 1 through 3) through a fuse 197 which prevents current overloading and affords protection of the batteries.

Also in accordance with the invention, as already indicated, the selector switch is movable only between first and second positions and is operable, when in the first position (see FIG. 1), to connect the first and second battery sets 19 and 21 in parallel relation to the motor 13 and operable, when in the second position (see FIGS. 2 and 3), to connect the first and second battery sets 19 and 21 in series relation to the motor 13 and to the charger 33.

In this regard, the contacts 123 and 131 of the selector switch 17 are connected by respective leads 151 and 153 to the terminals 23 and 27 of the first battery set 19. In addition, the contacts 127 and 135 are connected by respective leads 155 and 157 to the terminals 29 and 31 of the second battery set 21. Still further, the contacts 127 and 129 are connected by respective leads 161 and 163 to the terminals 37 and 39 of the charger 33. Still further, the contacts 127 and 131 are also connected by leads 165 and 167 to the terminals 14 and 15 of the direct current motor 13. The "off-on" switch 41, as well as the reversing switch 43 and the accelerator switch 47 are connected, in series relation, between the motor 13 and the selector switch 17.

Reversing switches for golf carts are well known and need not be further described, except to note that the selector switch 17 of the invention constitutes a modification of a previously existing three position reversing switch. Accelerator switches are also well known and are operable to enable variation in the effective voltage applied to the motor 13 when the selector switch 17 is in either the high or low speed setting, whereby the accelerator switch 47 provides various high speeds, as well as various low speeds, depending upon whether the selector switch 17 is set for high speed operation (i.e., series connection of the battery sets 19 and 21 as shown in FIG. 2) or for low speed operation (i.e., parallel connection of the battery sets 19 and 21 as shown in FIG. 1).

Means are provided for limiting rotary movement of the bus bar assembly 53 to the two positions alternately arranging the battery sets 19 and 21 in series and in parallel relation to the motor 13. While various arrangements can be employed, in the disclosed construction, such means includes the provision on the mounting plate 51 (see FIGS. 4, 6, and 7) of a raised portion 171 which can be attached to the mounting plate 51 or formed as a part of the mounting plate 51. The raised portion 171 includes an edge 173 which interferes with or prevents clockwise rotation (as seen in FIG. 4) of the bus bar 59 from the position of the bus bar assembly 53 (see FIGS. 2 and 3) affording series connection of the battery sets 19 and 21. In addition, the raised portion 171 includes an edge 175 which interferes with or prevents counterclockwise rotation (as seen in FIG. 4) of the bus bar 57 from the position of the bus bar assembly 53 (see FIG. 1) affording connection of the battery sets 19 and 21 in parallel relation. Thus, the bus bar assembly 53 is movable only between the two positions which are, in the specifically disclosed construction, spaced at approximately 45°.

Alternate means can be provided for limiting movement of the bus bar assembly 53 between the two specified positions. More particularly, the end 62 of the shaft 61 on the back side of the mounting plate 51 can be provided (as shown in FIGS. 5, 6, and 8) with a pin 177 which extends diametrically from the shaft 61 and the bushing 63 can be provided with projecting sections 179 which define diametrically extending shoulders 180 engageable by the pin 177 to prevent over-travel of the bus bar assembly 53 beyond the two positions.

In addition, detent means can be provided for releasably retaining the bus bar assembly 53 in either of the two positions. While various arrangements be employed, in the disclosed construction, the relieved area of the bushing 63 between the projections 179 is provided with two diametrically extending grooves 181 and 183 into which the pin 177 is selectively seated by action of the previously mentioned spring 111. Thus, the spring 111 serves both to bias the bus bars 57 and 59 against the contacts and to selectively locate the pin 177 in the grooves 181 and 183 to provide a detent arrangement.

When the battery sets 19 and 21 are in parallel relation (see FIG. 1), the contact 123 is electrically connected to the battery set 19 to the exclusion of electrical connection with the battery set 21. At the same time, the contact 135, and therefor the contact 121 is electrically connected to the battery set 21 to the exclusion of electrical connection to the battery set 19. However, when the battery sets are in series relation (see FIGS. 2 and 3), the contact 121 is electrically connected through the bus bar 57 to the contact 125 and through the electrical connector 137, with the contact 123. Accordingly, if electrical connection of the contacts 121 and 123 were permitted during movement of the selector switch 17 between the parallel connection position and the series connection position, the battery sets 19 and 21 could be electrically connected in both series and parallel arrangements and serious damage to the batteries could occur. Thus, means are provided for preventing the simultaneous electrical connection of the battery sets 19 and 21 in both parallel and series connection. In this regard, there is provided, on the mounting plate 51 (see FIGS. 4, 6, and 7), a raised portion or block 191 which is located to interfere with the end portion 93 of the bus bar 57 during movement of the bus bar assembly 53 between the series connection position and the parallel connection position. More specifically, the portion or block 191 includes edge surfaces 193 and 195 which are inclined so as to cam the bus bar end portion 93 onto the top of the raised block 191 during movement between the two angularly spaced positions and so as to thereby raise the bus bar end portion 93 out of contact with both contacts 121 or 123 during movement between the two positions, and thereby prevent simultaneous electrical connection of the contact 121 with both the contacts 123 and 127.

In operation of the disclosed construction, the shaft 61 is depressed to raise the pin 177 out of the engaged one of the grooves 181 and 183 to permit rotary movement of the bus bar assembly 53 from either the parallel connection position shown in FIG. 1 or the series connection position shown in FIGS. 2 and 3 to the other position. When the selector switch 17 is in the parallel position shown in FIG. 1, it will be noted that current flows from the battery set 21 through the lead 157 to the contact 135 and through the bus bar 59 to the contact 131. From the contact 131, current flows through the lead 167 and through the accelerator switch 47, the reversing switch 43 and the closed "off-on" switch 41 to the motor 13. Current then flows from the motor 13 through the lead 165 to the contact 127 and from the contact 127 through the lead 155 back to the same battery set 21. At the same time, current flows from the other battery set 19 through the lead 153 to the contact 131 and through the lead 167 to the motor 13. From the motor 13, current flows through the lead 165 to the contact 127 and then through the bus bar 57 and through the contact 123 and back through the lead 151 to the battery set 19. The contacts 121 and 129 are unconnected. Thus, when the "off-on" switch 41 is closed, the motor can be operated through a low speed range. The accelerator switch 47 connected in series with the motor 13 permits variation in the speed output within the low speed range and the reversing switch 43 permits changing of the direction of output of the motor 13.

When the selector switch is in the series position shown in FIGS. 2 and 3, the bus bar 57 connects the terminals 121 and 125 and the bus bar 59 connects the terminals 129 and 133. As a consequence, current flows from the second battery set 21 through the lead 157 to the contact 135 and then through the fuse 197 connecting the contact 135 to the contact 121. From contact 121 current flows through the bus bar 57 to the contact 125, then through the connection 137 to the contact 123 and then through the lead 151 to the first battery set 19. Current then flows from the first battery set 19 through the lead 153 to the contact 131. From the contact 131 current flows through the lead 167, accelerator switch 47, reversing switch 43, and through the closed "off-on" switch 41, to the motor 13. From the motor 13, current flows through the lead 165 back to the contact 127 and from the contact 127 through the lead 155 back to the second battery set 21, whereby there is completed a series circuit through both battery sets 19 and 21 to provide double the voltage to the direct current motor 13. As when the selector switch 17 is in the parallel connection position, the accelerator switch 47 permits variation in speed within the high speed range provided by the series connection of the battery sets 19 and 21 to the motor 13.

Referring further to FIG. 2, it will be seen that the lead 161 from the charger 33 is connected to the contact 127 and that the lead 163 from the charger 33 is connected to the contact 129 and, through the bus bar 59 and electrical connection 139 to the contact 131, whereby the charger 33 is connected to the series connected battery sets 19 and 21 in parallel relation with the motor 13. However, as shown in FIG. 2, the "off-on" switch 41 is closed and the charger 33 is not plugged in and therefor no charging results.

Referring to FIG. 3, the "off-on" switch 41 is now open and the charger 33 is plugged into a source of alternating current and as the charger 33 is connected to the battery sets 19 and 21 in series, charging of the battery sets 19 and 21 takes place. Because of the connection of the charger 33 through the lead 163 to the contact 129, the charger 33 cannot be connected to the battery sets 19 and 21 when the selector switch 17 is in the parallel connection position as the contact 129 is dead, i.e., electrically unconnected to the active parts of the circuit.

As already indicated, in the disclosed construction, the selector switch 17 is switchable between the parallel connection position and the series connection position by depressing the shaft 61 against the action of the spring 111 to disconnect the pin 177 from the engaged one of the grooves 181 and 183 and by then rotating the shaft 61. After rotation to desired position, the spring 111 serves to displace the shaft outwardly of the mounting plate 51 and also to seat the pin 177 in the applicable one of the grooves 181 and 183, as well as to bias the bus bars 57 and 59 against the connected contacts.

Various of the features of the invention are set forth in the following claims.

1. An electrical system for a battery powered, electrically driven vehicle, said system comprising a direct current drive motor having first and second terminals, a first battery set having first and second terminals, a second battery set having first and second terminals, a battery charger adapted to be plugged into an alternating current source and including first and second terminals, and a selector switch comprising a plate of insulating material, a bus bar assembly mounted on said plate for rotary movement between first and second angularly spaced positions and including first and second bus bars, a first contact engageable by one end of said first bus bar when said bus bar assembly is in said first position, a second contact engageable by said one end of said first bus bar when said bus bar assembly is in said second position and electrically connected to said first terminal of said first battery set, a third contact engageable by the other end of said first bus bar when said bus bar assembly is in said first position and electrically connected to said second contact, a fourth contact engageable by said other end of said first bus bar when said bus bar assembly is in said second position and electrically connected to said first terminals of said second battery set, of said charger, and of said drive motor, a fifth contact engaged by one end of said second bus bar when said bus bar assembly is in said first position and electrically connected to said second terminal of said charger, a sixth contact engageable by said one end of said second bus bar when said bus bar assembly is in said second position and electrically connected to said second terminals of said first battery set and of said motor, a seventh contact engageable by the other end of said bus bar assembly when said second bus bar is in said first position and electrically connected to said sixth contact, and an eighth contact engageable by said other end of said second bus bar when said bus bar assembly is in said second position and electrically connected to said second terminal of said second battery set, said first, second, third, fourth, fifth, sixth, seventh, and eighth contacts being fixed on said plate in equiangularly spaced relation from one another in the recited series and at a common radius from the rotary axis of said bus bar assembly.

2. An electrical system in accordance with claim 1 including a fuse electrically interposed between said first and eighth contacts.

3. An electrical system in accordance with claim 1 including means on said plate for restricting movement of said bus bar assembly to movement between said first and second positions, said movement restricting means including a member having first means for preventing rotary movement of one of said bus bars in one rotative direction beyond one of said first and second positions and having second means for preventing rotary movement of the other of said bus bars in the other rotary direction beyond the other of said first and second positions.

4. An electrical system in accordance with claim 1 wherein said first and second positions of said bus bar assembly are spaced apart at about 45° and wherein each of said bus bars respectively includes an offset central portion extending in spaced relation from the one of said contacts located between the two of said contacts respectively engaged by said bus bars.

5. A selector switch comprising a plate of insulating material, a bus bar assembly mounted on said plate for rotary movement between first and second angularly spaced positions and including first and second bus bars, a first contact engageable by one end of said first bus bar when said bus bar assembly is in said first position, a second contact engageable by said one end of said first bus bar when said bus bar assembly is in said second position, a third contact engageable by the other end of said first bus bar when said bus bar assembly is in said first position and electrically connected to said second contact, a fourth contact engageable by said other end of said first bus bar when said bus bar assembly is in said second position, a fifth contact engageable by one end of said second bus bar when said bus bar assembly is in said first position, a sixth contact engageable by said one end of said second bus bar when said bus bar assembly is in said second position, a seventh contact engageable by the other end of said second bus bar when said bus bar assembly is in said first position and electrically connected to said sixth contact, an eighth contact engageable by said other end of said second bus bar when said bus bar assembly is in said second position, said first, second, third, fourth, fifth, sixth, seventh, and eighth contacts being fixed on said plate in equiangularly spaced relation from one another in the recited series and at a common radius from the rotary axis of said bus bar assembly, and means on said plate engaging one end of one of said bus bars for displacing said one end of said one bus bar away from each of said contacts engageable by said one end of said one bus bar in the direction of the axis of rotary bus bar assembly movement and in response to rotary bus bar assembly movement in both rotary directions between said first and second positions to thereby prevent simultaneous electrical connection between said one end of said one bus bar and said engageable contacts.

6. An electrical system for a battery powered, electrically driven vehicle, said system comprising a direct current drive motor having first and second terminals, a first battery set having first and second terminals, a second battery set having first and second terminals, a battery charger adapted to be plugged into an alternating current source and including first and second terminals, and a selector switch comprising a plate of insulating material, a bus bar assembly mounted on said plate for rotary movement between first and second angularly spaced positions and including first and second bus bars, a first contact engageable by one end of said first bus bar when said bus bar assembly is in said first position, a second contact engageable by said one end of said first bus bar when said bus bar assembly is in said second position and electrically connected to said first terminal of said first battery set, a third contact engageable by the other end of said first bus bar when said bus bar assembly is in said first position and electrically connected to said second contact, a fourth contact engageable by said other end of said first bus bar when said bus bar assembly is in said second position and electrically connected to said first terminals of said second battery set, of said charger, and of said drive motor, a fifth contact engaged by one end of said second bus bar when said bus bar assembly is in said first position and electrically connected to said second terminal of said charger, a sixth contact engageable by said one end of said second bus bar when said bus bar assembly is in said second position and electrically connected to said second terminals of said first battery set and of said motor, a seventh contact engageable by the other end of said second bus bar when said bus bar assembly is in said first position and electrically connected to said sixth contact and an eigth contact engageable by said other end of said second bus bar when said bus bar assembly is in said second position and electrically connected to said second terminal of said second battery set, said first, second, third, fourth, fifth, sixth, seventh, and eighth contacts being fixed on said plate in equiangularly spaced relation from one another in the recited series and at a common radius from the rotary axis of said bus bar assembly, and means on said plate engaging one end of one of saod bus bars for displacing said one end of said one bus bar away from each of said contacts engageable by said one end of said one bus bar in the direction of the axis of rotary bus bar assembly movement and in response to rotary bus bar assembly movement in both rotary directions between said first and second positions to thereby prevent simultaneous electrical connection between said one end of said one bus bar and said engageable contacts.

7. A selector switch comprising a plate of insulating material, a bus bar assembly mounted on said plate for rotary movement between first and second angularly spaced positions and including first and second bus bars, a first contact engageable by one end of said first bus bar when said bus bar assembly is in said first position, a second contact engageable by said one end of said first bus bar when said bus bar assembly is in said second position, a third contact engageable by the other end of said first bus bar when said bus bar assembly is in said first position and electrically connected to said second contact, a fourth contact engageable by said other end of said first bus bar when said bus bar assembly is in said second position, a fifth contact engageable by one end of said second bus bar when said bus bar assembly is in said first position, a sixth contact engageable by said one end of said second bus bar when said bus bar assembly is in said second position, a seventh contact engageable by the other end of said second bus bar when said bus bar assembly is in said first position and electrically connected to said sixth contact, and an eighth contact engageable by said other end of said second bus bar when said bus bar assembly is in said second position, said first, second, third, fourth, fifth, sixth, seventh, and larly spaced relation from one another in the recited series and at a common radius from the rotary axis of said bus bar assembly.

8. A switch in accordance with claim 7 including means on said plate for restricting movement of said bus bar assembly to movement between said first and second positions, said movement restricting means including a member having first means for preventing rotary movement of one of said bus bars in one rotative direction beyond one of said first and second positions and having second means for preventing rotary movement of the other of said bus bars in the other rotary direction beyond the other of said first and second positions.

9. A selector switch in accordance with claim 7 wherein said first and second positions of said bus bar assembly are spaced apart at about 45° and wherein each of said bus bars respectively includes an offset central portion extending in spaced relation from the one of said contacts located between the two of said contacts respectively engaged by said bus bars.

* * * * *